(12) United States Patent
Smith

(10) Patent No.: US 11,960,889 B2
(45) Date of Patent: Apr. 16, 2024

(54) METHOD AND SYSTEM FOR OPTIMIZING DATA TRANSFER FROM ONE MEMORY TO ANOTHER MEMORY

(71) Applicant: Nordic Semiconductor ASA, Trondheim (NO)

(72) Inventor: Chris Smith, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 43 days.

(21) Appl. No.: 17/914,262

(22) PCT Filed: Mar. 25, 2021

(86) PCT No.: PCT/EP2021/057778
§ 371 (c)(1),
(2) Date: Sep. 23, 2022

(87) PCT Pub. No.: WO2021/191365
PCT Pub. Date: Sep. 30, 2021

(65) Prior Publication Data
US 2023/0111058 A1  Apr. 13, 2023

(30) Foreign Application Priority Data
Mar. 25, 2020 (GB) ..................................... 2004349

(51) Int. Cl.
*G06F 9/30* (2018.01)
*G06F 9/38* (2018.01)

(52) U.S. Cl.
CPC ........ *G06F 9/30043* (2013.01); *G06F 9/3004* (2013.01); *G06F 9/3012* (2013.01); *G06F 9/3836* (2013.01)

(58) Field of Classification Search
CPC .. G06F 9/30043; G06F 9/3004; G06F 9/3012; G06F 9/3836
See application file for complete search history.

(56) References Cited

U.S. PATENT DOCUMENTS 8,719,463 B2    5/2014  Chi
9,524,162 B2 *  12/2016 Tran ........................ G06F 9/384
(Continued)

FOREIGN PATENT DOCUMENTS

JP    2018 128845 A    8/2018

OTHER PUBLICATIONS

IPO Search Report under Section 17 for GB2004349.3, dated Sep. 9, 2020, 4 pages.
(Continued)

*Primary Examiner* — Corey S Faherty
(74) *Attorney, Agent, or Firm* — Klarquist Sparkman, LLP

(57) ABSTRACT

A method and system for moving data from a source memory to a destination memory by a processor is disclosed herein. The destination memory stores a sequence of instructions and the sequence of instructions comprises one or more load instructions and one or more store instructions. The processor initially moves the one or more store instructions from the destination memory to the source memory. The processor then executes the one or more load instructions from the destination memory. On executing the one or more load instructions, the data is loaded from the source memory to at least one register in the processor. The processor further initiates execution of the one or more store instructions stored in the source memory. On executing the one or more store instructions from the source memory, the processor stores the data from the at least one register to the destination memory.

19 Claims, 9 Drawing Sheets

(56) References Cited

U.S. PATENT DOCUMENTS

| | | |
|---|---|---|
| 2010/0115240 A1 | 5/2010 | Falik et al. |
| 2013/0290639 A1 | 10/2013 | Tran et al. |
| 2014/0075164 A1* | 3/2014 | Indukuru ............ G06F 11/3419 |
| | | 712/E9.016 |
| 2014/0143513 A1 | 5/2014 | Reid et al. |
| 2018/0232238 A1 | 8/2018 | Jiang |

OTHER PUBLICATIONS

International Search Report and Written Opinion for PCT/EP2021/057778, dated Jun. 30, 2021, 15 pages.

Jiang et al., "Architecture Support for Improving Bulk Memory Copying and Initialization Performance," *18th International Conference on Parallel Architectures and Compilation Techniques*, Sep. 2009, 12 pages.

Vaidyanathan et al., "Designing Efficient Asynchronous Memory Operations Using hardware Copy Engine: A Case Study with I/OAT," *IEEE International Parallel and Distributed Processing Symposium*, Mar. 2007, 8 pages.

Xia et al., "Accelerating Network Applications on X86-64 Platforms," *IEEE Symposium on Computers and Communications*, Jun. 2010, pp. 906-912.

\* cited by examiner

METHOD AND SYSTEM FOR OPTIMIZING DATA TRANSFER FROM ONE MEMORY TO ANOTHER MEMORY

CROSS REFERENCE TO RELATED APPLICATIONS

This is the U.S. National Stage of International Application No. PCT/EP2021/057778, filed Mar. 25, 2021, which was published in English under PCT Article 21(2), which in turn claims the benefit of GB Patent Application No. 2004349.3, filed Mar. 25, 2020.

BACKGROUND

Most programs running on a computer system or a data processing system perform a substantial amount of data transfer operations i.e. moving a block of data from one memory to another memory. A typical example of a program is a boot loader. The boot loader is a simple program or code sequence that boots or starts the computer system by transferring a set of programs and data from one memory to another memory to be executed by a processor. In some situations, the boot loader boots the devices connected to the computer system that went to hibernation or sleep. Examples of such devices include IoT devices that go to hibernation or sleep quite often. In some examples, the boot loader boots up these IoT devices up to 20 times a second which involves a lot of data transfer operations. Therefore, it is important to optimize the method for moving data from one memory to another memory.

Typically, programs are written and provided as a source code or assembly code instruction sequence to the computer system. The programs include functions for performing data transfer or for copying data from one memory to another. One of the commonly used functions for copying data from one memory to another is a memory copying function called memcpy( ). The program is written in a human readable format (or source code) by a programmer or user and is transformed into a machine-readable code by a compiler and/or an assembler in the computer system. A linker then stores the program as a set of instructions (machine readable code) that can be loaded into a memory of the computer system to be executed by the processor. The programs may be loaded directly from an external source into a memory and is executed from the memory, or the programs may be moved into a memory from which the boot loader can transfer them into a required final location in any memory prior to execution. An example of such a memory is a ROM image. The processor then performs data transfer or memory copying by executing the instructions fetched from the memory.

Generally, when the processor fetches an instruction to move data from one memory to another memory in a clock cycle, the execution of the instruction stalls if the concurrent instructions to be fetched and the data to be accessed are in the same memory. This is because the processor is unable to perform both instruction fetch and data access from the memory at the same time. Thus, typically a data transfer operation is completed by the processor in two or more clock cycles. An increase in the execution time of data transfer operations causes an increase in computing overhead of the computer system. Hence there is a need for the transfer of data from one memory to another memory to be performed in a more optimized manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are various methods and systems for moving data from a source memory to a destination memory by a processor. The destination memory stores a sequence of instructions and the sequence of instructions comprises one or more load instructions and one or more store instructions. The processor initially moves the one or more store instructions from the destination memory to the source memory. The processor then executes the one or more load instructions from the destination memory. On executing the one or more load instructions, the data is loaded from the source memory to at least one register in the processor. The processor further initiates execution of the one or more store instructions stored in the source memory. On executing the one or more store instructions from the source memory, the processor stores the data from the at least one register to the destination memory.

According to a first aspect there is provided a method of moving data from a source memory to a destination memory by a processor comprising a plurality of registers, the destination memory storing a sequence of instructions, wherein the sequence of instructions comprises one or more load instructions and one or more store instructions, the method comprising the following steps of: moving the one or more store instructions from the destination memory to the source memory; executing of the one or more load instructions from the destination memory; loading the data from the source memory to at least one register in the processor, on executing the one or more load instructions; initiating execution of the one or more store instructions stored in the source memory; and storing the data from the at least one register to the destination memory on executing the one or more store instructions from the source memory.

Optionally, the step of initiating the execution of the one or more store instructions stored in the source memory is performed on executing a branch instruction subsequent to the one or more load instructions stored in the destination memory.

Optionally, the step of moving the one or more store instructions is performed on executing a set of data transfer instructions in the sequence of instructions.

Optionally, the step of moving the one or more store instructions from the destination memory to the source memory is performed by executing a set of preconfigured instructions before executing the sequence of instructions.

Optionally, the method further comprises performing execution of the load instruction by performing the following steps of: fetching the load instruction from the destination memory in a first clock cycle, said load instruction identifying a memory address in the source memory of data to be loaded; fetching a subsequent load instruction from the destination memory in a second clock cycle; and loading the data from the memory address in the source memory to a register in the plurality of registers in the second clock cycle.

Optionally, the method further comprises performing execution of the store instruction by performing the following steps of: fetching the store instruction from the source memory in a first clock cycle, said store instruction identifying a memory address in the destination memory for storing the data; fetching a subsequent store instruction from the source memory in a second clock cycle; and storing the data from the register in the plurality of registers to the destination memory in the second cycle.

Optionally, the one or more load instructions and the one or more store instructions are executed in a loop for moving the data from the source memory to the destination memory.

Optionally, the one or more store instructions are stored among the sequence of instructions or as data in the destination memory Optionally, the sequence of instructions and the data is stored as machine code.

Optionally, the method further comprises generating the sequence of instructions by converting an assembly code or source code written by a user.

According to a second aspect there is provided a computer system configured for moving data, the system comprising: a source memory configured to store data; a destination memory configured to store sequence of instructions comprising one or more load instructions and one or more store instructions; and a processor, coupled to the source memory and the destination memory, configured to execute the sequence of instructions, wherein the processor is configured to: move the one or more store instructions from the destination memory to the source memory; executing the one or more load instructions from the destination memory; loading the data from the source memory to at least one register in the processor, on executing the one or more load instructions; initiating execution of the one or more store instructions stored in the source memory; and storing the data from the at least one register to the destination memory on executing the one or more store instructions from the source memory.

Optionally, the processor moves the one or more store instructions to the source memory on executing a set of data transfer instructions among the sequence of instructions.

Optionally, the processor moves the one or more store instructions from the destination memory to the source memory on executing a set of preconfigured instructions before executing the sequence of instructions.

Optionally, the processor executes the one or more store instructions from the source memory on executing a branch instruction among the sequence of instructions.

Optionally, the destination memory is configured to store sequence of instructions in a stack memory.

Optionally, the processor is coupled to the source memory and the destination memory through an instruction path and a data path.

Optionally, the processor fetches the instructions from the source memory and the destination memory through the instruction path.

Optionally, the processor accesses the data from the source memory and move the data to the destination memory through the data path.

According to a third aspect there is provided, computer readable code configured to cause the method according to the first aspect to be performed when the code is run.

According to a fourth aspect there is provided a computer readable storage medium having encoded thereon the computer readable code according to the third aspect.

The computer system may be embodied in hardware on an integrated circuit. There may be provided a method of manufacturing, at an integrated circuit manufacturing system, a computer system. There may be provided an integrated circuit definition dataset that, when processed in an integrated circuit manufacturing system, configures the system to manufacture a computer system. There may be provided a non-transitory computer readable storage medium having stored there on a computer readable description of a computer system that, when processed in an integrated circuit manufacturing system, causes the integrated circuit manufacturing system to manufacture an integrated circuit embodying a computer system.

There may be provided an integrated circuit manufacturing system comprising: a non-transitory computer readable storage medium having stored thereon a computer readable description of the computer system; a layout processing system configured to process the computer readable description so as to generate a circuit layout description of an integrated circuit embodying the computer system; and an integrated circuit generation system configured to manufacture the computer system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
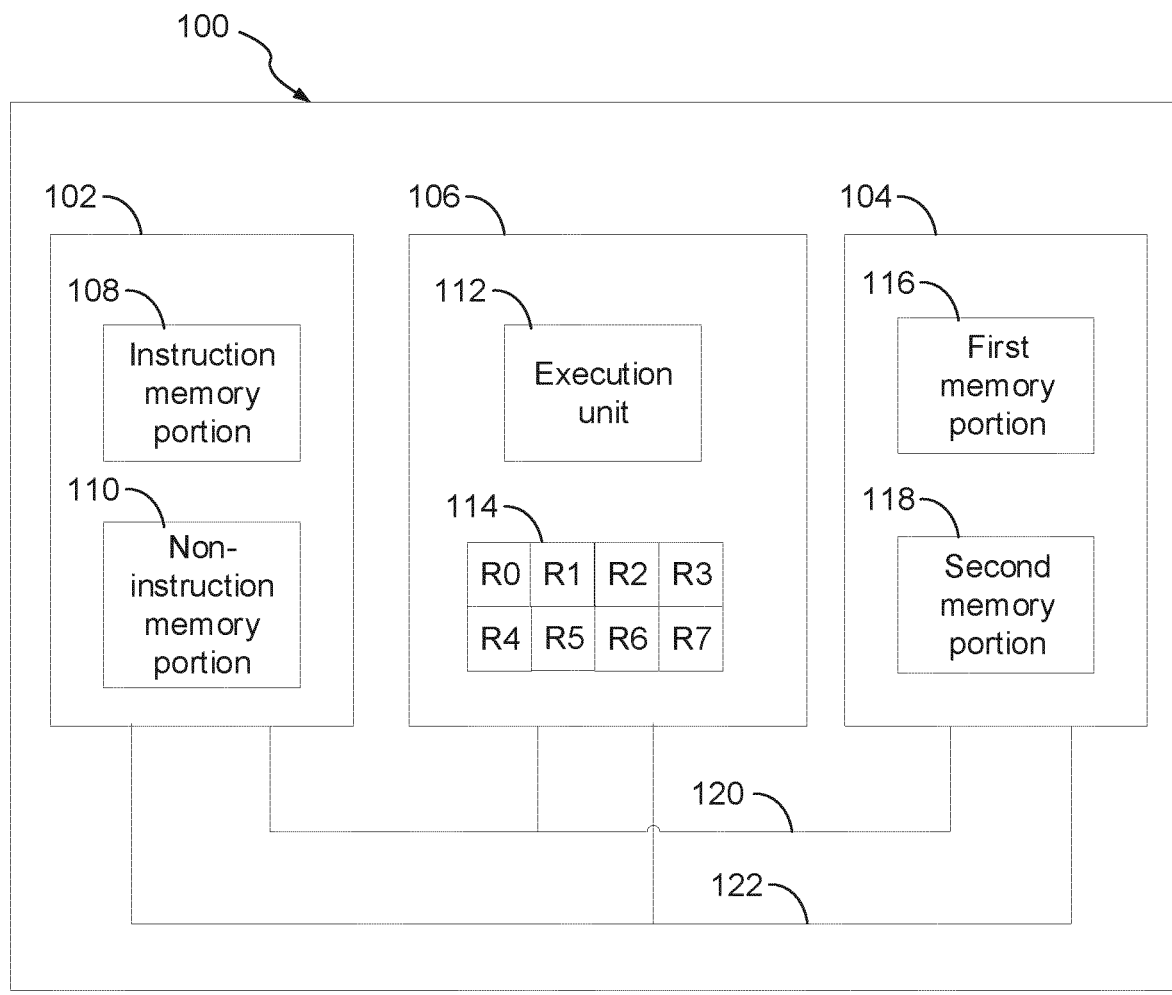
FIG. 1 is a block diagram of an example of a computer system with a processor coupled to a source memory and a destination memory.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, there are scenarios in which a processor takes several hundreds of clock cycles to complete execution of instructions for a program. This includes the stalling of execution of each data transfer instruction for two or more clock cycles (that sums up to hundreds of clock cycles) which reduces the performance of a computer system. The clock cycle is a measure of the speed of the processor in a computer system. The processor is considered faster if there are more clock cycles in a second. The performance of the processor is determined based on instructions per clock cycle, i.e. average number of clock cycles required for executing each instruction. While performing data transfer operations, the processor may stall for over hundreds of clock cycles by the time the processor finishes executing all the data transfer operations. In such cases, the other memory operations waiting for the completion of data transfer operations are halted for hundreds of clock cycles, which affect the performance of the computer system.

Typically, in a pipelined computer system, a processor is enabled to effectively complete the execution of an instruction in a single clock cycle. This is because the processor is enabled to perform an instruction fetch and a data access during each clock cycle. During a clock cycle, the processor is configured to fetch a new instruction and perform the execution of a previously fetched instruction. However, if the processor fetches the new instruction from the same memory to which a data access request (to perform the actions required by the previously fetched instruction) is sent while executing the previously fetched instruction in the clock cycle, then the instruction fetch of the new instruction stalls for two or more clock cycles. Though it is mentioned here that the instruction fetch stalls, it is known to a person skilled in the art, that during each clock cycle, either the instruction fetch or the data access by the processor could stall.

This is a common scenario while executing data transfer instructions such as load instructions and store instructions. For example, while executing a load instruction in a clock cycle, if the data to be loaded from a memory, is accessed from the memory where a next instruction is to be fetched in that clock cycle, then the instruction fetch of the next instruction stalls. Similarly, while executing a store instruction, if the data is stored into the same memory from where the next instruction is fetched, the instruction fetch of the next instruction stalls. Since there are a substantial amount of data transfer instructions executed by the processor while running most programs in the computer system for moving data from one memory to another, there is a need to optimize the execution of data transfer instructions without stalling.

Described herein are various techniques for moving of data from one memory to another memory in a computer system in an optimized manner. The method is performed by a processor by executing a sequence of instructions stored a memory coupled to the processor in the computer system. The sequence of instructions comprises a plurality of data transfer instructions such as load instructions and store instructions. The method enables the processor to execute each data transfer instruction in a single clock cycle, thereby optimizing the transfer of data from one memory to another memory in the computer system.

For example, reference is made to FIG. 1 which illustrates an example computer system 100 executing a program comprising computer executable instructions that refer to one or more data elements. The computer system, in an example, is an embedded system which is a computing-based system that is designed for a specific purpose, and is typically constrained in its size, power requirements and/or features in comparison to general purpose computing-based systems. For example, some computer systems, such as the computer system 100 of FIG. 1, do not include dedicated memory management hardware, such as a memory management unit (MMU), typical of a general-purpose computing-based system. Certain computer systems typically also have real-time computing constraints, giving additional importance to achieving high, but predictable performance. A non-limiting example of a computer system is a radio processing unit (RPU) which is specifically designed to process radio signals. The computer system 100 may be coupled to different memories.

FIG. 1 is a block diagram of an example of a computer system 100 with a processor 106 coupled to a source memory 102 and a destination memory 104. The source memory 102 stores a sequence of instructions and data elements corresponding to the programs run on the computer system. The sequence of instructions comprises a set of computer executable instructions. The program written in a source code or assembly code language by a user is converted to machine-readable code (computer readable code) or object code by a compiler and/or an assembler in the computer system 100. The compiler converts source code written by a user to assembly code. The assembler converts the assembly code either written by the user or generated by the compiler to object code or machine-readable code. The machine-readable code or object code is processed into completed computer executable instructions by a linker. The linker is a program that combines object code to create computer executable instructions referring to fixed memory locations. The output from the linker is then stored in a memory associated with the computer system 100. The sequence of instructions and data elements may be stored in the source memory 102 by the user configuring the computer system, or during manufacture.

The processor 106 comprises an execution unit 112 for executing the sequence of instructions which cause the processor to perform different actions on or using the data elements stored in the source memory 102. The sequence of instructions refers to the data elements and instructs the computer system (e.g. the processor of the computer system) which actions to perform on, or using, the data elements (also referred to as data). The term "data" is used herein to refer to a combination of bits or bytes that represent a separate item of information. Examples of "data" include, but are not limited to, variables, arrays and buffers. Further the processor 106 comprises a plurality of registers 114. In an example of FIG. 1, the plurality of registers is shown as eight registers R0-R7. The plurality of registers 114 may include any number of registers. The processor 106 may be a microprocessor, controller or any other suitable type of processor for processing computer executable instructions to control the operation of the computer system 100.

The term "source memory" and "destination memory" is used herein to mean a memory unit that is situated in proximity to the processor 106 to enable the processor 106 to access the information (e.g. computer executable instructions and data elements) stored therein. The source memory 102 and the destination memory 104 may be implemented using any suitable type of memory such as, but not limited to, RAM or ROM. The source memory 102 and the destination memory 104 may comprise a plurality of memory portions. Each memory portion represents a region of the total memory. The plurality of memory portions in the source memory 102 and the destination memory 104 may be of the same size or may be different sizes. The memory portions may form a contiguous block of memory; or the memory portions may be separated from each other by other memory modules or components. In the example shown in FIG. 1, the source memory 102 and the destination memory 104 comprise two memory portions. However, it will be evident to a person of skill in the art that this is an example only and that the source memory 102 and the destination memory 104 may not be separate regions and may be contiguous.

In the example shown in FIG. 1, the source memory 102 comprises memory portions such as an instruction memory portion 108 and a non-instruction memory portion 110. The instruction memory portion 108 and the non-instruction memory portion 110 are two regions of the same source memory. The instruction memory portion 108 is configured for storing the sequence of instructions of the program and the non-instruction memory portion 110 are designated to store data for the program. The destination memory 104 comprises a first memory portion 116 and a second memory portion 118. The first memory portion 116 and the second memory portion 118 are two regions of the same destination memory. The sequence of instructions comprises a plurality of data transfer instructions including one or more load instructions and one or more store instructions. The processor 106 executes the data transfer instructions for moving a block of data (one or more data elements) from the source memory 102 to the destination memory 104.

The architecture of the computer system 100 discussed herein comprises different signal paths (e.g. buses) for instructions and data. When the processor 106 is executing the sequence of instructions (the stored computer executable instructions) there will be many clock cycles in which the processor 106 would access both an instruction and a data element stored in the source memory 102 and the destination memory 104 in the same clock cycle. To allow the processor 106 to issue both an instruction fetch request and a data access request to the source memory 102 and/or the destination memory 104, there are two paths or buses 120 and 122 between the processor 106 and the memory (source memory 102 and the destination memory 104). For example, in FIG. 1 there is an instruction path 120 for sending instruction fetch requests and a data path 122 for sending data access requests. While the instruction path 120 and the data path 122 ensure that the processor is enabled access the instructions and the data elements from the source memory 102 or from the destination memory 104 in the same clock cycle, there arises problems when the instruction fetch request and the data access request try to access the same memory in the same clock cycle as discussed above. In such cases, the instruction fetch of the subsequent instructions stalls.

A typical example of a sequence of instructions generated while running a program with data transfer operations is shown in Table 1. In the example given in Table 1, the processor initially executes loop set up instructions to set up a loop for executing the sequence of instructions for moving data from one memory to another memory. The sequence of instructions in the loop comprises a single load instruction and a single store instruction to transfer a single data element each time while executing the loop. The processor executes the load instruction for loading the data element from the source address to a register in the processor. Further, a store instruction is executed to store the data element from the register to an address in the destination memory. While executing the load instruction, instruction fetch of the subsequent instruction (in this example, the store instruction) stalls each time as the processor performs both the instruction fetch and the data access from the same source memory. Further, for each data transfer operation, the processor requires to execute three loop control instructions for controlling the loop. Hence, there is a significant computational overhead/loop overhead which reduces the performance of the computer.

In the example programs below, the following notation is used:
SXXX denotes address location XXX in the source memory. In this example, the sequence of instructions is stored in the source memory at the addresses indicated, and the data elements are also stored in the source memory at the addresses indicated
DXXX denotes address location XXX in the destination memory
RX denotes register X in the processor
N is an integer, where N indicates the number of times to iterate through the loop and hence the number of data elements to move in this example

TABLE 1

| Address | Instruction | |
| --- | --- | --- |
| S000: | Set R0, 0 | Loop Set up |
| S001: | Set R1, N | |
| S002: | Load R2, S100 + R0 | Store |
| S003: | Store R2, DXXX + R0 | |
| S004: | Add R0, 1, R0 | Loop control |
| S005: | Compare R0, R1 | |
| S006: | Branch_if S002 | |
| S007: | End | |
| . . . | | |
| . . . | | |
| S100: | Data Element 1 | Data |
| S101: | Data Element 2 | |
| S200 | Data Element n | |

Another typical example of a sequence of instructions generated while running a program having a memory copying function or data transfer operations is shown in Table 2. The example of Table 2 reduces the loop overhead by increasing the number of load and store instructions executed in every iteration of the loop, such that there are more store and load instructions for each of the three loop control instructions. The sequence of instructions comprises a block of load instructions (x load instructions, where x is any number) and a block of store instructions (x store instructions) and a block of loop set up and loop control instructions. While running the program, the processor initially sets up a loop by executing the loop setup instructions. The processor, further, executes each load instruction in the block of load instructions for loading a data element from an address in the source memory to a register among plurality of registers in the processor.

Further, the processor executes all the store instructions in the block of store instructions to move the data loaded into the plurality of registers to the destination memory. Once the block of load instructions and the block of store instructions are executed, the loop control instructions are executed for determining if the loop needs to be repeated. In this example, the instruction fetch of the subsequent instruction stalls while executing each load instruction as the processor performs both instructions fetch and data access from the source memory. While executing each loop, the processor stalls for a minimum of 'x' clock cycles. Thus, the processor stalls for 'n' clock cycles, while moving n data elements from source memory to destination memory (as the processor stalls for each load instruction in each iteration of the loop). For example, if there are 128 data elements to be transferred and 16 load instructions in the loop (x=16), then the processor might stall for a minimum of 128 clock cycles (which is number of iterations of loop×16), while executing the loop. In other examples 'n' could any multiple of 16 depending on the amount of data elements to be transferred. This example requires that the number of elements to be transferred be a multiple of sixteen. It will be evident to a person skilled in the art that this constraint could be addressed in a more complex implementation. When the number of instructions is not a multiple of x, then the program comprises epilogue loops to execute the remaining instructions (i.e. instructions remaining after executing the multiples of x).

TABLE 2

| Address | Instruction | |
|---|---|---|
| S000: | Set R0, 0 | Loop set up |
| S001: | Set R1, N | |
| S002: | Load R2, S100 + R0 | Load block |
| S003: | Load R3, S100 + R0 + 1 | |
| S004: | Load R4, S100 + R0 + 2 | |
| . . . | x times | |
| S040: | Store R2, DXXX + R0 | Store Block |
| S041: | Store R3, DXXX + R0 + 1 | |
| S042: | Store R4, DXXX + R0 + 2 | |
| . . . | x times | |
| S060: | Add R0, x, R0 | Loop control |
| S061: | Compare R0, R1 | |
| S062: | Branch_if S002 | |
| S063: | End | |
| . . . | | |
| . . . | | |
| S100: | Data Element 1 | Data |
| S101: | Data Element 2 | |
| . . . | | |
| S200 | Data Element n | |

The inventor found that the data transfer operations of the computer system 100 is optimized by a technique that enables the processor 106 to fetch and execute data transfer instructions in the sequence of instructions, in a single clock cycle without stalling, thereby increasing the performance of the computer system. The data transfer operations are optimized by adapting the sequence of instructions as described in detail below.

The sequence of instructions comprises a plurality of data transfer instructions including one or more load instructions and one or more store instructions. To avoid stalls, one or more instructions from the plurality of data transfer instructions are moved and executed from a different memory. In an example, sequence of instructions comprises a set of data transfer instructions (a set up portion) for moving one or more instructions. The examples of the set of data transfer instructions include a set of load and store instructions or a set of move instructions.

In an example shown in FIG. 1, where the sequence of instructions is stored in the source memory 102, the one or more instructions (such as the one or more load instructions) are initially moved to a different memory (destination memory 104) on executing the set of data transfer instructions. Therefore, while executing the sequence of instructions, when, the processor 106 fetches the one or more instructions in the plurality of data transfer instructions (load instructions) from the destination memory 104, this enables the execution of the plurality of data transfer instructions to be performed on the data in the source memory 102 in a single clock cycle without stalling. The method of executing each of the plurality data transfer instruction in the sequence of instructions is explained in detail below. Thus, one or more instructions in the plurality of data transfer instructions are fetched from the destination memory 104 and the remaining instructions in the plurality of data transfer instructions are fetched from the source memory 102 for moving data from the source memory 102 to the destination memory 104.

Figure 2:
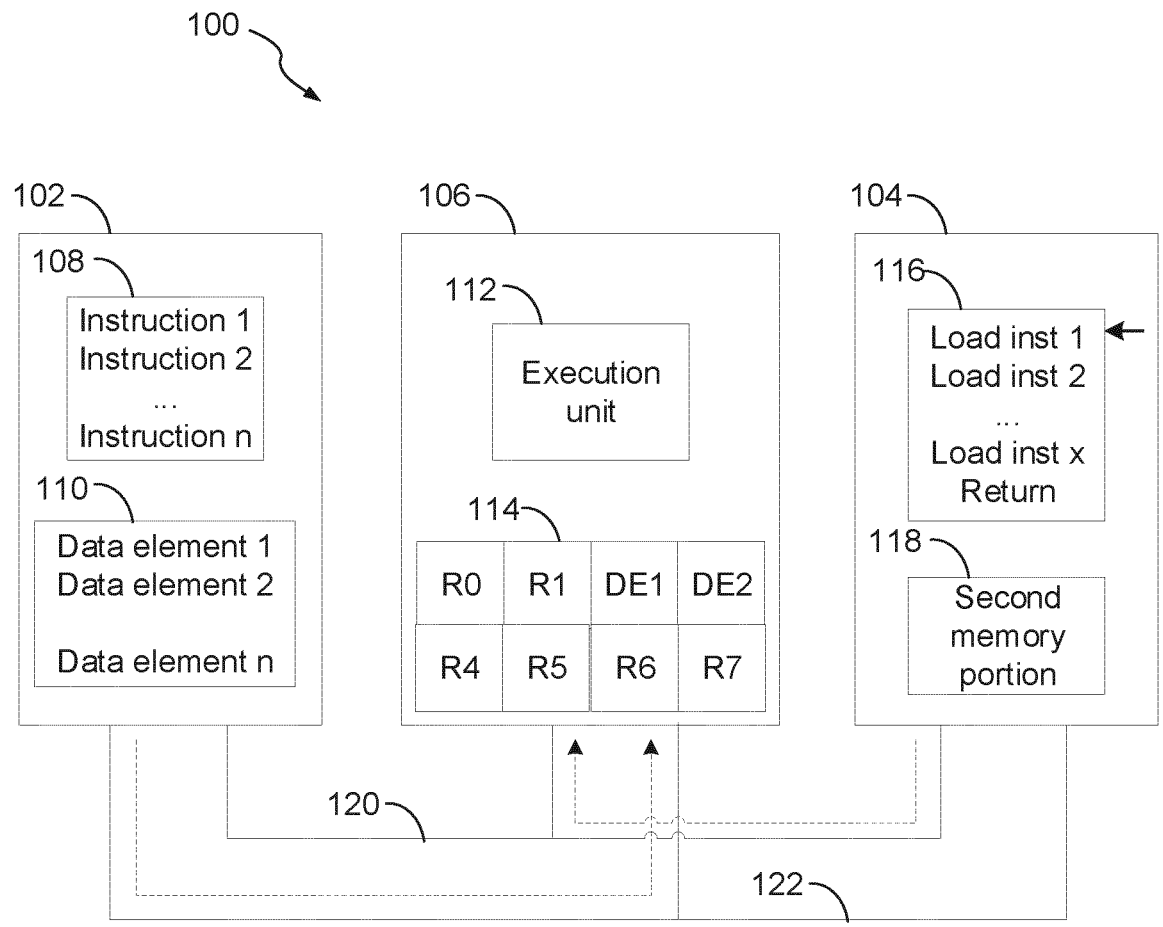
FIG. 2 is a block diagram of an example of a computer system executing one or more load instructions, when a sequence of instructions is stored in a source memory.
Figure 3:
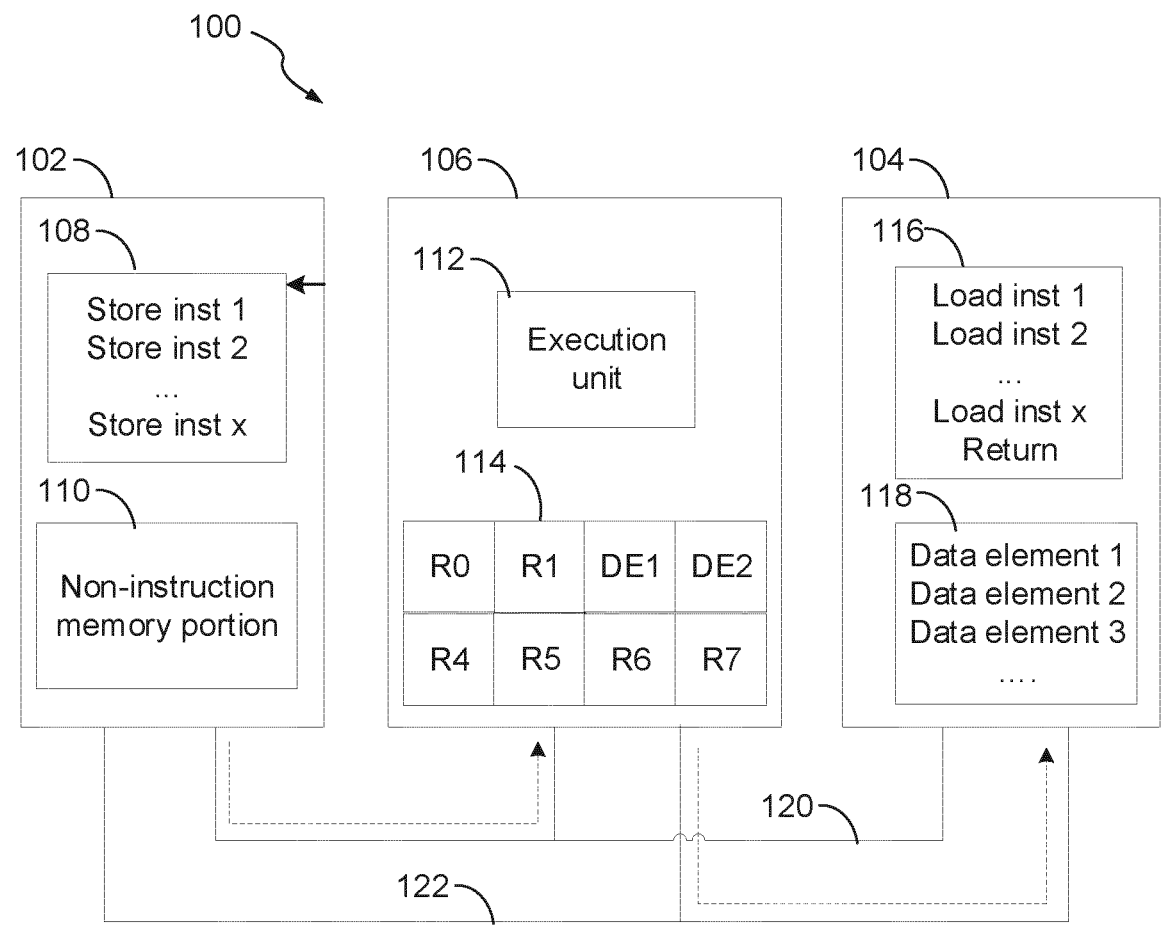
FIG. 3 is a block diagram of an example of a computer system executing one or more store instructions, when a sequence of instructions is stored in a source memory.

An example of a method of moving data from the source memory 102 to the destination memory 104 is explained in detail using FIG. 2 and FIG. 3. As shown in FIG. 2 the instruction memory portion 108 in the source memory 102 comprises a sequence of instructions depicted instruction 1, instruction 2 . . . instruction n. The sequence of instructions includes a plurality of data transfer instructions such as one or more load instructions, and one or more store instructions for moving data from source memory 102 to the destination memory 104. The program is written such that the one or more load instructions are grouped together as a block of x load instructions and the one or more store instructions are grouped together as a block of x store instructions (where x is an integer). The data is stored as a plurality of data elements in the non-instruction memory portion 110 as data element 1, data element 2 . . . data element n.

An example of the optimized sequence of instructions generated while running the program having data transfer operations for transferring data from one memory to another memory is shown in Table 3.

TABLE 3

| Address | Instruction | |
|---|---|---|
| S000: | Load R4, S020 | Load instruction |
| S001: | Store R4, D000 | set-up |
| S002: | Load R5, S021 | |
| S003: | Store R5, D001 | |
| S004: | Load R6, S022 | |
| S005: | Store R6, D002 | |
| S006: | Set R0, 0 | Loop Setup |
| S007: | Set R1, N | |
| S008: | Branch D000 | |
| S009: | Store R2, DXXX + R0 | Store portion |
| S010: | Store R3, DXXX + R0 + 1 | |
| S011: | Add R0, 2, R0 | Loop control |
| S012: | Compare R0, R1 | |
| S013: | Branch_if S008 | |
| S014: | End | |
| . . . | | |
| S020: | Load R2, S100 + R0 | Load portion |
| S021: | Load R3, S100 + R0 + 1 | |
| S022: | Return | |
| . . . | | |
| S100: | Data Element 1 | Data |
| S101: | Data Element 2 | |
| S200 | Data Element n | |

From the example given in Table 3, consider that the instruction memory portion 108 has source memory addresses from S000 to S099 and the non-instruction memory portion 110 have source memory addresses from S100-S200. Similarly, consider that the first memory portion 116 has the destination memory addresses from D000 to D099 and the second memory portion 118 has the destination memory addresses from D100 to D200.

The sequence of instructions comprises a set of data transfer instructions (represented as 'load instruction set up' in the Table 3) for moving the block of x load instructions and a return instruction (together represented as load portion in Table 3) to the destination memory 104. The load instruction set up in this example comprises a set of load and store instructions for moving the load portion, to the destination memory 104. The load portion is stored in the source memory either along with the sequence of instructions or separate from the sequence of instructions. In this example, the load portion in table 3 comprises 2 load instructions, but there could be any number of load instructions. The load portion can also be stored as a part of the plurality of data elements in the non-instruction memory portion 110. The sequence of instructions further comprises a loop comprising loop setup instructions, a store portion and loop control instructions. The one or more store instructions in the plurality of data transfer instructions are grouped together as a block of x store instructions (represented as 'the store portion' in table 3). In this example, the store portion in table 3 comprises 2 store instructions but could have any number of store instructions.

While running the program, the processor 106 executes the sequence of instructions from the first instruction in a sequential order pointed by a program counter. In the example, the processor starts executing the sequence of instructions from the source memory address S000. The sequence of instructions comprises a set of data transfer instructions referred to as load set up instructions in the source memory. The set of data transfer instructions are performed either at the start of the sequence of instructions or as a separate set of preconfigured instructions prior to executing the sequence of instructions. In this example, the load set up instructions are stored in the source memory addresses S000-S005. On executing the load set up instructions, the processor moves the load portion to the first memory portion 116 in the destination memory 104. In this example, on executing the load set up instructions, the processor moves the load portion to the destination memory addresses D000 to D002. FIG. 2 shows the one or more load instructions referred to as load inst 1 to load inst x moved to the first memory portion 116.

Further, the processor 106 executes the loop set up instructions to set up the loop. After executing the loop set up instructions, the processor 106 executes a first branch instruction (e.g. Branch D000) to branch to destination memory address (D000) in the first memory portion 116. Thus, execution of the branch instruction causes the processor 106 to initiate fetching the instructions from a destination memory address, in this case D000 in the first memory portion 116. In one example, the first memory portion 116 is used as a stack.

As the processor 106 starts fetching the one or more load instructions from the stack in the destination memory 104, the program counter is updated with an address of a first load instruction (load inst 1) which is stored in the region of the destination memory being used as a stack. The stack can be located using a stack pointer, where the stack pointer is a register that conventionally stores the address of the most recently used area of stack memory. In this case, the stack pointer contains a value from which the destination memory address D000 is derived and used as a branch destination. Thus, the instruction at address D000 to fetched and executed, with the address D000 moving into the program counter. Each load instruction comprises an indication of a memory location in the source memory from where a data element is to be loaded into a register in the plurality of registers 114. In this example, the first load instruction instructs the processor to load data element 1 from the address location in the source memory S100. In some examples, the memory address used may be relative to an address held in a register rather than that address itself.

The processor 106 fetches the first load instruction (load inst 1) from the destination address D000, which when executed, will move data element 1 from the first source address (S100) to the register R2 (shown as data element 1, DE1) in the plurality of registers 114. The processor 106 fetches the first load instruction from a first location D000 in the stack memory in the destination memory 104 via the instruction path 120 in a first clock cycle. After fetching the first load instruction, the program counter updates to hold the address of the second load instruction (D001). During a second clock cycle, the processor 106 fetches the second load instruction (load inst 2) from a second location D001 in the stack memory. Further, in the second clock cycle, the processor 106 executes the first load instruction to access the data element 1 from the first address S100 of the non-instruction memory portion 110 in the source memory 102 via the data path 122. Since the instruction fetch and data access by the processor 106 in the second clock cycle is from two different memories and via two different paths/buses the execution of the first instruction and the fetching of the second instruction do not stall. Thus, the processor 106 is capable of fetching and executing the first load instruction in two clock cycles.

Similarly, after fetching the second load instruction the program counter updates to hold the address of a subsequent instruction in the stack memory during a third clock cycle. The processor 106 fetches the return instruction from the stack memory during the third clock cycle. Further, during the third clock cycle the processor 106 executes the second load instruction fetched in the second clock cycle to load the data element 2 from a second source address (S101) in the non-instruction memory portion 110 to a register R3 among the plurality of registers 114. Thus, an instruction fetch and data fetch for the one or more load instructions stored in the destination memory occurs in each clock cycle. For each load instruction, the flow of instructions from the destination memory 104 to the processor 106 is depicted by arrows along the instruction path 120 and the flow of data from the source memory 102 to the plurality of registers 114 is depicted by the arrows along the data path 122. Thus, the processor 106 is capable of fetching and executing load instructions effectively in a single clock cycle without stalling.

The execution of the return or branch instruction causes the processor 106 to return to execute the sequence of instructions from the source memory 102. The return instruction updates the program counter with an address of the instruction in the source memory. In another example, a branch instruction is used instead of the return instruction to branch to an address location in the source memory. Hence the program counter is updated to point to an instruction in the sequence of instructions subsequent to the first branch instruction (Branch D000). The processor 106 continues processing the sequence of instructions in a sequential order from the updated location. The next portion of the sequence of instructions comprises one or more store instructions for moving data elements from the plurality of registers 114 to the destination memory 104.

FIG. 3 explains the execution of the one or more store instructions in the sequence of instructions. The one or more store instructions are stored in the source memory 102 in the sequence of instructions subsequent to the first branch instruction in the instruction memory portion 108. FIG. 3 shows the one or more store instructions stored in the instruction memory portion 108 as store inst 1, store inst 2 . . . store inst x. As noted above the program counter is updated with address of a first store instruction (shown by an arrow in FIG. 3). Each store instruction comprises an indication of a memory location in the destination memory to which a data element is to be stored from a register in the plurality of registers 114. In some examples, the first memory location (DXXX) to which the data element is to be stored may be addressed relative to the value held in a register.

At a first instance, the program counter contains the updated address S009 of the first store instruction (store inst 1). As the program counter points to a first store instruction at a first clock cycle, the processor 106 sends an instruction fetch request to the source memory 102 to fetch the first store instruction via the instruction path 120. The program counter updates to store the address S010 of a second store instruction after fetching the store inst 1. During a second clock cycle, the processor 106 fetches the second store instruction, store inst 2 from the source memory 102 via the instruction path 120. Further, during the second clock cycle the processor 106 executes the store inst 1. The processor 106 transfers the data element 1 from the register R2 to the first location (D100) in the second memory portion 118 in the destination memory via the data path 122. The processor 106 fetches the instruction from the source memory via the instruction path 120 and stores the data to the destination memory 104 via the data path 122. Hence the execution of the first store instruction occurs in two clock cycles without stalling.

Similarly, after fetching the second store instruction the program counter updates to store the address of a next instruction (in the loop control instructions) S011 during a third clock cycle. The processor 106 fetches the next instruction during the third clock cycle. Further, during the third clock cycle the processor 106 executes the second store instruction fetched in the second clock cycle to load the data element 2 from a register R3 among the plurality of registers 114 to the address (D101) in the second memory portion 118. Thus, an instruction fetch and data access for store instructions occur in a single clock cycle without stalling. While executing the block of x store instructions, all the data stored in the plurality of registers 114 are stored to the second memory portion 118 in the destination memory 104. For each store instruction, the flow of instruction from the source memory 102 to the processor 106 is depicted by arrows along the instruction path 120 and the flow of data from the plurality of registers to the destination memory 104 is depicted by the arrows along the data path 122.

Once all the store instructions in the store portion are executed, the processor performs the loop control instructions to check if the loop needs to be continued. In the above example, when the loop is executed a second time, the processor 106 executes the branch instruction (Branch if S008) to branch to the source address S008. The processor 106 further fetches the first branch instruction (Branch D000) to initiate the execution from the destination memory address D000 to fetch the first load instruction. While executing the loop control instructions, the register R0 is incremented with a value equal to the number of load instructions or store instructions in the loop, in this example, R0 is incremented with 2 as there are two load instructions. Now, the processor executes the one or more load instructions in the load portion to load data from a next set of memory location (i.e. S102 and S103) in the source memory to the plurality of registers. Similarly, the processor executes the one or more store instructions in the store portion to store data from the plurality of registers to the next set of memory addresses in the destination memory (i.e. D102 and D103). Thus, the loop is executed for a number of iterations to move the data from one memory to another without stalling.

Hence, neither the one or more load instructions nor the one or more store instructions stall while executing the loop for any number of iterations. The processor will stall only for a few clock cycles initially while executing the load and store instructions in the set of data transfer instructions. Thus, the processor 106 is enabled to execute the one or more load instructions and the one or more store instructions for hundreds or thousands of times to move data from the source memory to the destination memory without stalling, thereby increasing the performance of the computer system 100.

Figure 4:
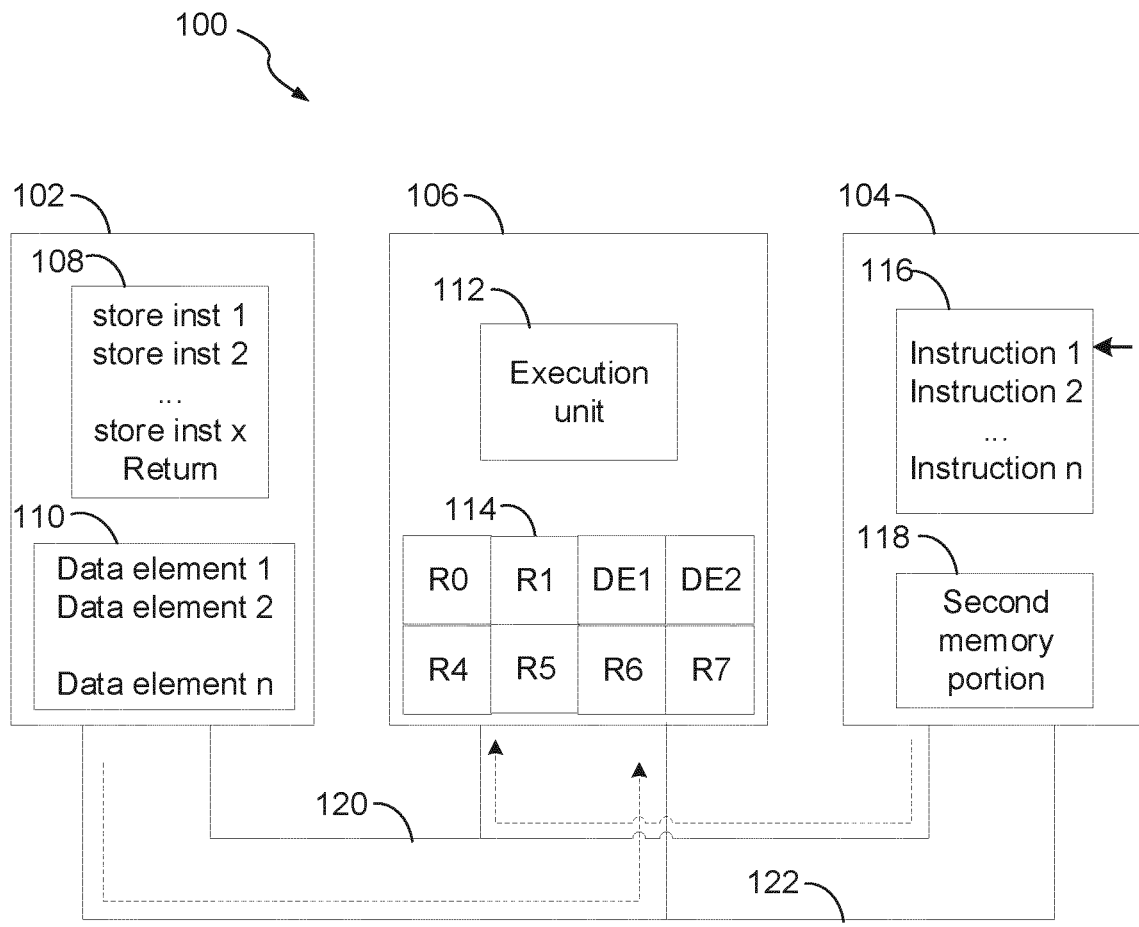
FIG. 4 is a block diagram of an example of a computer system executing one or more load instructions, when a sequence of instructions is stored in a destination memory.

In another example, the sequence of instructions may be stored in the destination memory 104 and the data elements in the source memory 102 in the computer system 100. FIG. 4 illustrates this scenario where the sequence of instructions (instruction 1, instruction 2 . . . instruction n) are stored in a first memory portion 116 in the destination memory 104. The sequence of instructions comprises a plurality of data transfer instructions including the one or more load instructions and the one or more store instructions for moving data from the source memory 102 to the destination memory 104. As the sequence of instructions is stored in the destination memory 104 where the data is to be moved, the data transfer operation stalls during the execution of store instructions. This is because the data is stored to the same memory from where the instructions are fetched during the execution of the one or more store instructions.

The execution of data transfer instructions is optimized by adapting the program to prevent stalls. The one or more load instructions are grouped together as a block of x load instructions and the one or more store instructions are grouped together as a block of x store instructions in the sequence of instructions. The processor is enabled to move the one or more store instructions to a different memory prior to the execution of the sequence of instructions to prevent stalling. In one example, the program is written such that the processor 106 executes a set of data transfer instructions causing the processor to move the one or more store instructions to a different memory prior to execution. The set of data transfer instructions are performed either at the start of the sequence of instructions or as a separate set of preconfigured instructions prior to executing the sequence of instructions. In FIG. 4 the one or more store instructions are moved to the source memory 102 prior to or at the beginning of executing the sequence of instruction. FIG. 4 shows the one or more store instructions moved to the instruction memory portion 108 as store inst 1, store inst 2 . . . store inst x.

An example of an optimized sequence of instructions generated while running the program would comprise a set of data transfer instructions, and a loop comprising loop set up instructions, the one or more load instructions and loop control instructions. Once the store instructions are moved to the source memory the processor 106 starts executing the sequence of instructions from the destination memory 104 in a sequential order pointed by a program counter. The instructions are executed by an execution unit 112 in the processor 106. The processor executes the loop set up instructions to set up the loop. After executing the load set up instructions, the program counter updates to store the address of a first load instruction (not shown in the FIG. 4) in the sequence of instructions stored in the destination memory 104 in this example. Consider that the first load instruction instructs the processor 106 to load a first data element (data element 1 or DE1) from a first address in the non-instruction memory portion 110 in the source memory to a register R2 in the plurality of registers 114.

During a first clock cycle, the processor 106 fetches the first load instruction from the first memory portion 116 (stack memory) in the destination memory 104 via the instruction path 120. Further, during a second clock cycle, the program counter increments to point to the second load instruction. This enables the processor 106 to fetch a second load instruction from the stack memory in the destination memory 104. Also, during the second clock cycle, the execution unit 112 in the processor 106 decodes and executes the first load instruction to move the data element 1 (DE1) from the first address in the non-instruction memory portion 110 in the source memory 102 to the register R2 in the plurality of registers 114. Thus, during the second clock cycle the processor fetches the second load instruction from the destination memory 104 via the instruction path 120 and access the data from the source memory 102 via the data path 122.

Similarly, after fetching the second load instruction the program counter updates to store the address of a next instruction during a third clock cycle. The processor 106 fetches the next instruction during the third clock cycle. Further, during the third clock cycle the processor 106 executes the second load instruction fetched in the second clock cycle to load the data element 2 (DE2) to register R3 among the plurality of registers 114. Thus, an instruction fetch and data access of load instructions occur in a single clock cycle without stalling. Similarly, all the load instructions in the one or more load instructions are fetched and executed to move data from the source memory 102 to the plurality of registers 114, as shown in the FIG. 4. For each load instruction, the flow of instructions from the destination memory 104 to the processor 106 is depicted by arrows along the instruction path 120 and the flow of data from the source memory 102 to the plurality of registers is depicted by the arrows along the data path 122. Thus, the processor 106 is capable of fetching and executing load instructions in a single clock cycle without stalling.

Figure 5:
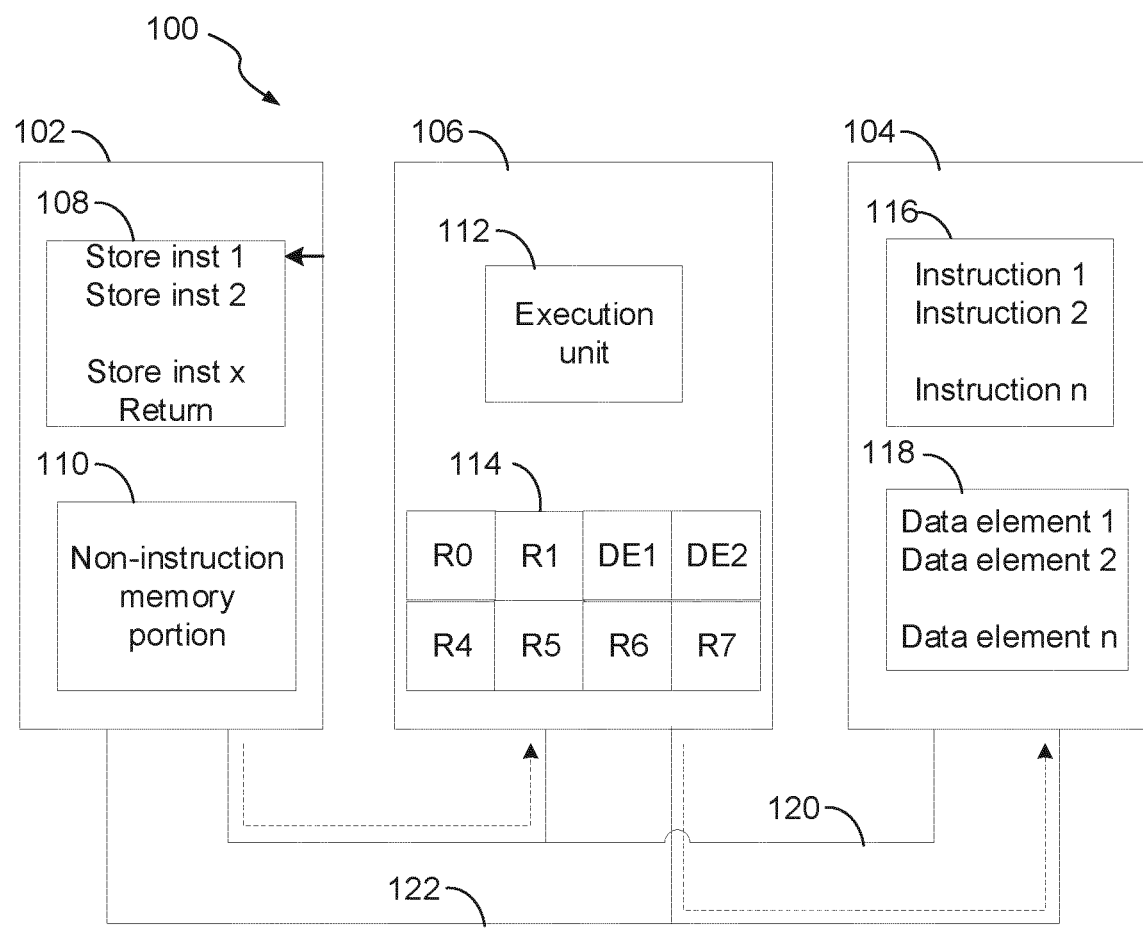
FIG. 5 is a block diagram of an example of a computer system executing one or more store instructions, when a sequence of instructions is stored in a destination memory.

After executing the one or more load instructions the processor 106 executes a branch instruction (for example Branch S000) subsequent to the one or more load instructions. The branch instruction causes the program counter to be updated with address of a first store instruction moved to the source memory 102. The execution of the one or more store instructions is explained with the help of FIG. 5. As shown in FIG. 5, the program counter (shown by an arrow to the instruction memory portion 108), points to the first store instruction in the source memory 102. The processor 106 fetches the first store instructions from the source memory 102 at a first clock cycle via the instruction path 120 (depicted by the arrows on the path 120). After fetching the first store instruction, the program counter updates to point to the second store instruction (store inst 2) in the source memory 102.

During a second clock cycle, the processor 106 fetches the second store instruction from the source memory 102. Also, the processor 106 executes the first store instruction fetched in the first clock cycle. The first store instruction causes the processor to store the data element 1 stored in R2 to a first location in the second memory portion 118 in the destination memory 104. The processor 106 stores the data element 1 to the destination memory 104 via the data path 122 depicted by the arrows shown on the data path 122. During the second clock cycle, as the instruction fetch of the second store instruction and data access for the first store instruction is from different memory, the fetching of the second load instruction does not stall.

Similarly, each store instruction is fetched from the source memory 102 and is executed to move data elements from the plurality of registers 114 to the destination memory 104. After executing all store instructions in the one or more store instructions, the processor executes a return instruction to return the execution of the sequence of instructions. For each store instruction, the flow of instructions from the source memory 102 to the processor 106 is depicted by arrows along the instruction path 120 and the flow of data from the plurality of registers to the destination memory 104 is depicted by the arrows along the data path 122. Since the instruction fetch and data access is from different memories, the fetch or execution of none of the store instructions stall. Therefore, the method enables the processor to move the data from the source memory 102 to the destination memory 104 without stalling of data transfer operations.

On returning to the execution of the sequence of instructions, the processor 106 executes the loop control instructions to determine if the loop needs to be repeated. When the loop is executed a next time, the one or more load instructions are executed from the destination memory and the one or more store instructions are executed from the source memory to move a set of data subsequent to the data moved with the previous loop to a location in the destination memory subsequent to where the data is stored in the previous loop. Thus, the loop is executed for number of times for moving data from the source memory to destination memory without stalling. The stalling occurs only while executing the set of data transfer instructions for the first time for moving the one or more store instructions to the source memory.

In another example, the method of moving data from a source memory to a destination memory by a processor comprising a plurality of registers is explained. The processor executes a sequence of instructions stored in one of the source memory or the destination memory. The sequence of instructions comprises a plurality of data transfer instructions such as one or more load instructions and one or more store instructions. On executing the sequence of instructions, the sequence of instructions causes the processor to perform the following steps. The processor while executing the sequence of instructions performs a data transfer operation for moving one or more instructions from the plurality of data transfer instructions to one of the source memory or the destination memory from where the sequence of instructions is stored initially. In a first example, the processor moves the one or more load instructions from the plurality of data transfer instructions to the destination memory if the sequence of instructions is stored in the source memory. The execution of the sequence of instructions for moving data from source memory to destination memory, in this first example is explained with reference to FIGS. 2 and 3. In a second example, the processor moves the one or more store instructions from the plurality of data transfer instructions to the source memory if the sequence of instructions is stored in the destination memory. The execution of the sequence of instructions for moving data from source memory to destination memory, in this second scenario has been explained with reference to FIGS. 4 and 5.

Figure 6:
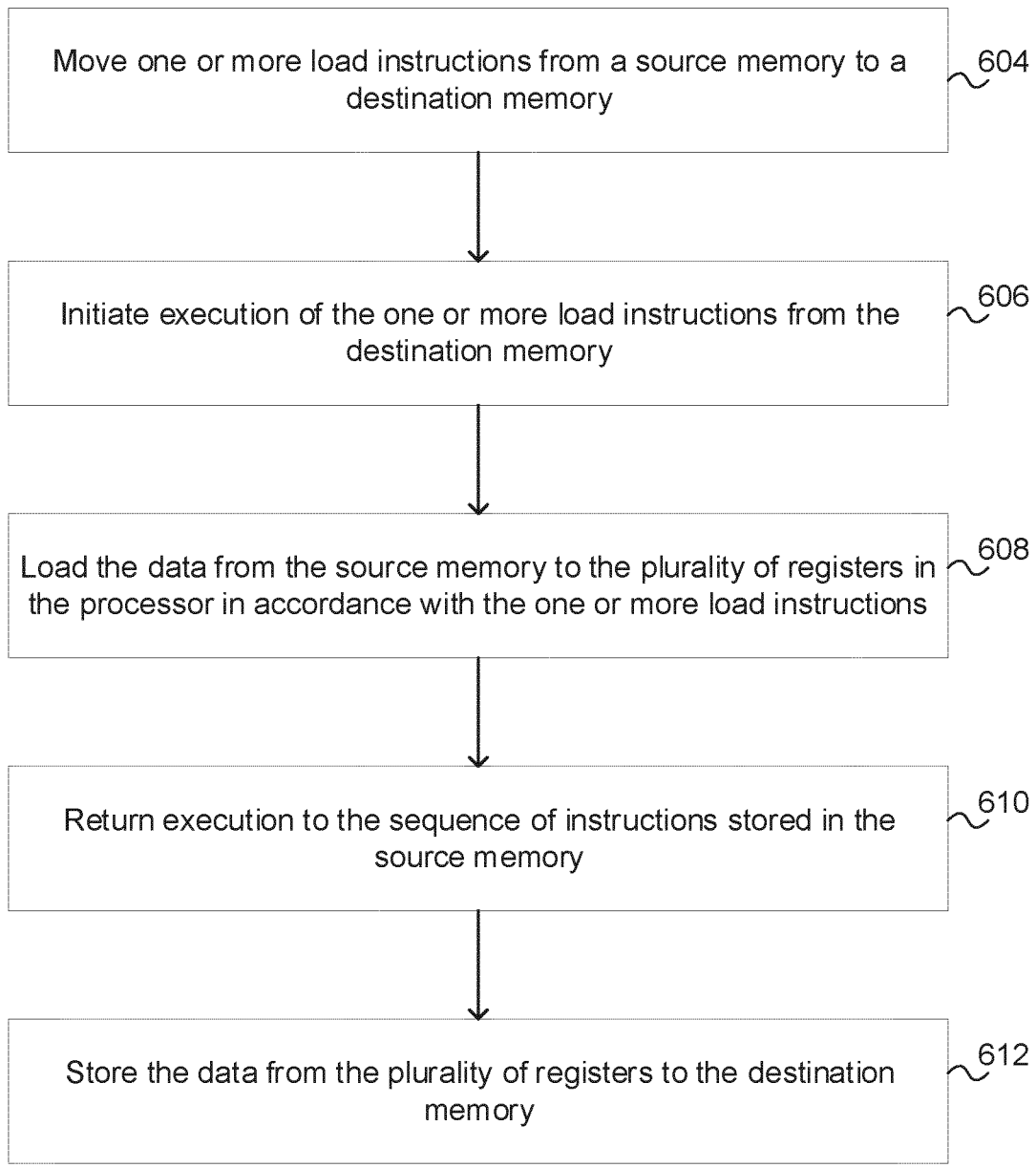
FIG. 6 shows a flow diagram of an example of a method of moving data from a source memory to a destination memory.

FIG. 6 is a flowchart explaining a method of moving data from a source memory to a destination memory. The method is performed by a processor executing a sequence of instructions stored in the source memory in a sequential order pointed by a program counter. The processor is coupled to both the source memory and the destination memory via an instruction path and a data path. The sequence of instructions comprises a plurality of data transfer instructions such as one or more load instructions and one or more store instructions. The one or more load instructions are grouped together as a block of load instructions and the one or more store instructions are grouped together as a block of store instructions. The sequence of instructions is configured to cause the processor to perform the following steps to move data from the source memory to the destination memory.

In step 604, the method includes moving the one or more load instructions from the source memory to the destination memory. The one or more load instructions are moved by performing a set of data transfer instructions for moving the one or more load instructions from the sequence of instructions in the source memory to the destination memory. In an example, the first memory portion is a stack memory.

In step 606, the method includes initiating execution of the one or more load instructions from the destination memory. The execution of the one or more load instructions may be initiated on executing a first branch instruction in the sequence of instructions which causes the processor to begin fetching instruction from a new memory location. The first branch instruction causes the processor to fetch instructions from the branch destination, in this case to fetch a first load instruction from the source memory. After executing the first branch instruction the processor fetches and executes the one or more load instructions from the destination memory in a sequential order.

In step 608, the method includes loading the data from the source memory to at least one register in the plurality of registers in the processor, on executing the one or more load instructions stored in the destination memory. For each load instruction, the processor fetches a load instruction from the destination memory via the instruction path during a first clock cycle. The load instruction identifies a memory address of data to be loaded from the source memory. During a second clock cycle, the processor fetches a next load instruction from destination memory via the instruction path and executes the load instruction fetched during the first clock cycle. The execution of the load instruction causes the processor to access data from the memory address in the source memory via the data path to load the data into a register among the plurality of registers. Since, during the second clock cycle, the instruction fetch and data access by the processor occurs from different memories, the execution of the load instructions does not stall. Therefore, the load instruction is fetched in the first clock cycle and the executed in the second clock cycle. Thus, effectively a load instruction is fetched and executed in a single clock cycle.

Once all the load instructions in the one or more load instructions are executed, at step 610 the method includes returning the execution to the sequence of instructions stored in the source memory. The method causes the processor to return to execute the sequence of instructions from the source memory on executing a second branch instruction or return instruction at the end of one or more load instructions stored in the destination memory. The second branch instruction or return instruction causes the processor to fetch an instruction from the branch destination, in this case to fetch the next instruction after the first branch instruction in the sequence of instructions from the source memory. After executing the second branch instruction, the processor fetches and executes the sequence of instructions from the source memory in a sequential order. The processor further executes the one or more store instructions in the sequence of instructions in a sequential order.

On executing the one or more store instructions, at step 612, the method includes storing the data from the at least one register in the plurality of registers to the destination memory. For each store instruction, the processor fetches a store instruction from the source memory via the instruction path during a first clock cycle. The store instruction identifies a memory address in the destination memory for storing the data. During a second clock cycle, the processor fetches a next store instruction from source memory via the instruction path and executes the store instruction fetched during the first clock cycle. The execution of the store instruction causes the processor to store data to the memory address in the destination memory via the data path from a register among the plurality of registers. As the instruction fetch and data access by the processor during the second clock cycle occurs from different memories, the execution of the store instruction does not stall. Thus, the store instruction is fetched in the first clock cycle and the executed in the second clock cycle. Similarly, a fetch and an execution of the store instruction occur in a single clock cycle. Therefore, the method described enables a processor to move data from the source memory to destination memory in an optimized manner as the execution of one or more load instructions and the one or more store instructions does not stall.

Note that in an alternate example, the step of moving the load instruction (604) may be performed prior to the execution of the program (602). Alternatively, the program may be preconfigured to have these instructions already present in a different memory, such that no more operations (of the type in step 604) are required to obtain the benefit of performing the data transfer without stalling.

Figure 7:
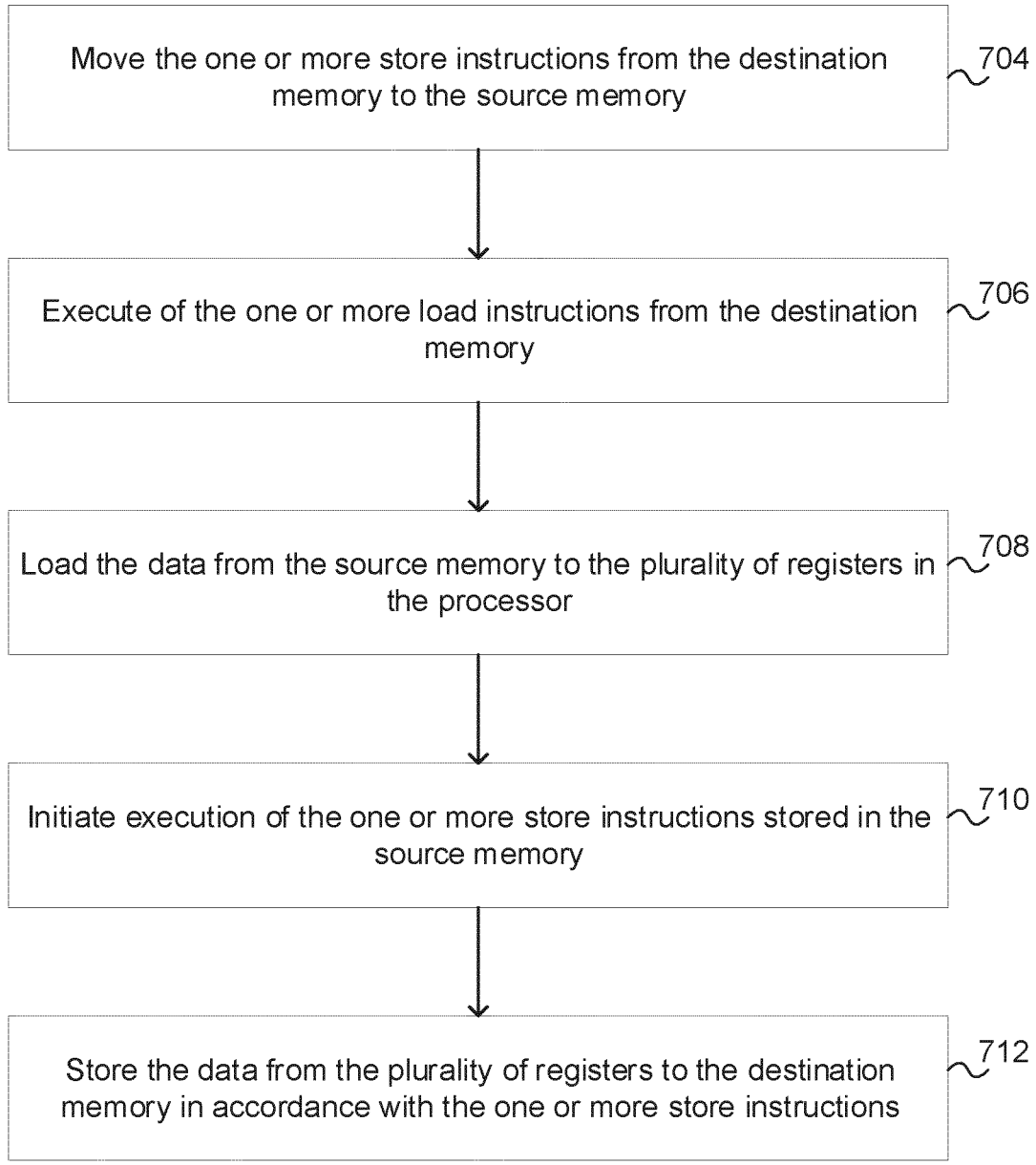
FIG. 7 shows a flow diagram of an example of another method of moving data from a source memory to a destination memory.

FIG. 7 is a flowchart explaining another method of moving data from a source memory to a destination memory. The method is performed by executing a program comprising a sequence of instructions stored in the destination memory by a processor. The processor is coupled to both the source memory and the destination memory via an instruction path and a data path. The sequence of instructions comprises one or more load instructions and one or more store instructions. The one or more load instructions are grouped together as a block of load instructions and the one or more store instructions are grouped together as a block of store instructions. The sequence of instructions is configured to cause the processor to perform the following steps to move data from the source memory to the destination memory.

In step 704, the method includes moving the one or more store instructions from the destination memory to the source memory. The one or more store instructions are moved by performing a set of data transfer instructions for moving the one or more store instructions to the source memory.

In step 706, the method includes executing of the one or more load instructions in the sequence of instructions stored in the destination memory. The processor fetches and executes the one or more load instructions from the destination memory in a sequential order.

In step 708, the method includes loading the data from the source memory to at least one register in the plurality of registers in the processor, on executing the one or more load instructions in the sequence of instructions stored in the destination memory. For each load instruction, the processor fetches a load instruction from the destination memory via the instruction path during a first clock cycle. During a second clock cycle, the processor fetches a next load instruction from destination memory via the instruction path and executes the load instruction fetched during the first clock cycle. The execution of the load instruction causes the processor to access data from the source memory via the data path to load the data into a register among the plurality of registers. As the instruction fetch and data access by the processor during the second clock cycle occurs from different memories, the execution of the one or more load instructions does not stall. Thus, the load instruction is fetched in the first clock cycle and the executed in the second clock cycle. Thus, a fetch and an execution of the load instructions occurs in a single clock cycle.

Once all the load instructions in the one or more load instructions are executed, at step 710 the method includes initiating execution of the one or more store instructions stored in the source memory. The method causes the processor to initiate execution of the one or more store instructions on executing a first branch instruction subsequent to the one or more load instructions. The first branch instruction causes the processor to fetch instructions from the branch destination, in this case to fetch the first store instruction from the source memory. After executing the first branch instruction the processor fetches and executes the one or more store instructions from the source memory in a sequential order.

On executing the one or more store instructions, at step 712, the method includes storing the data from the at least one register in the plurality of registers to the destination memory. For each store instruction, the processor fetches a store instruction from the source memory via the instruction path during a first clock cycle. During a second clock cycle, the processor fetches a next store instruction from source memory via the instruction path and executes the store instruction fetched during the first clock cycle. The execution of the store instruction causes the processor to store data to the destination memory via the data path from a register among the plurality of registers. As the instruction fetch and data access by the processor during the second clock cycle occurs from different memories, the execution of the store instruction does not stall. Thus, the store instruction is fetched in the first clock cycle and the executed in the second clock cycle. The one or more load instructions and the one or more store instructions are executed for n number of times in a loop, thereby the processor to move data from the source memory to the destination memory in an optimized manner. The processor is enabled to effectively execute each load instruction and each stores instruction in a single clock cycle without stalling due to concurrent access to the same memory.

Note that in an alternate example, the step of moving the store instructions (704) may be performed prior to the execution of the program (702). Alternatively, the program may be preconfigured to have these instructions already present in a different memory, such that no more operations (of the type in step 704) are required to obtain the benefit of performing the data transfer without stalling.

Figure 8:
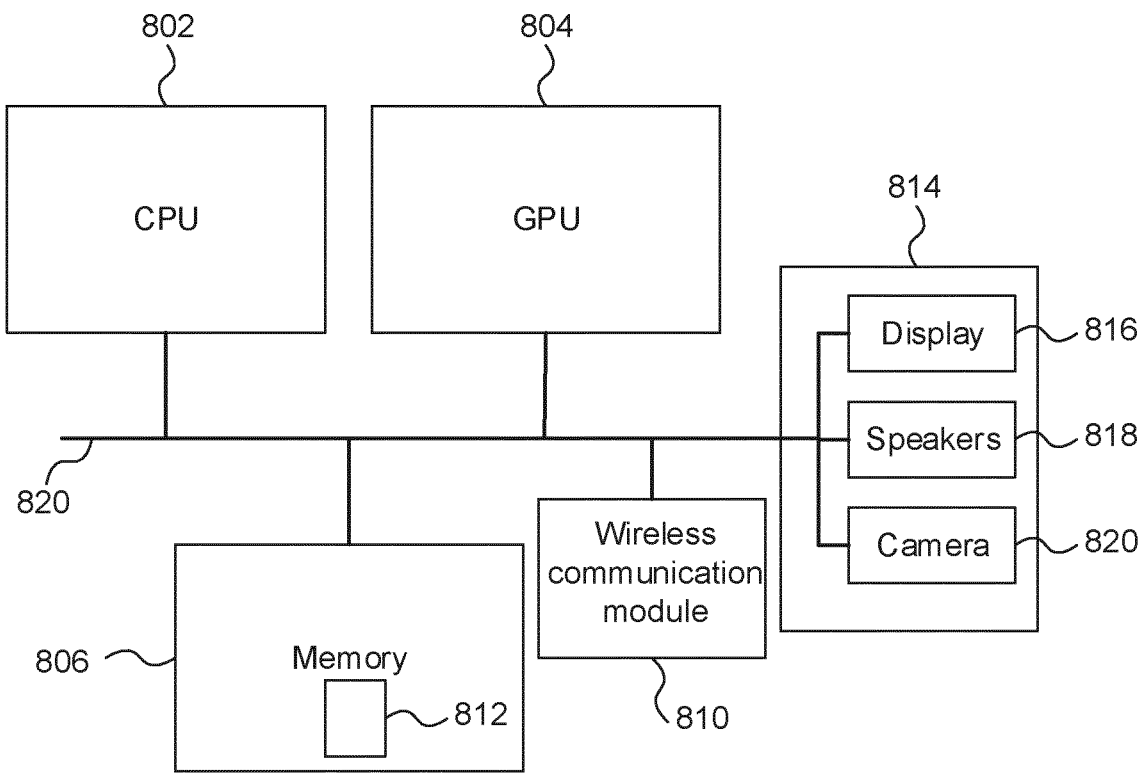
FIG. 8 shows a block diagram of a computer system.

FIG. 8 shows an example of a computer system in which the data transfer operation described herein may be implemented. The computer system comprises a CPU 802, a GPU 804, a memory 806, a wireless communication module 810 and other devices 814, such as a display 816, speakers 818 and a camera 820. The data transfer operations described herein may be implemented in one or more of the CPU 802, the GPU 804, and the wireless communication module 810 or any other module performing data transfer between memory locations. The components of the computer system can communicate with each other via a communications bus 820. A store 812 is implemented as part of the memory 806.

The computer system of FIG. 8 and the computer system in FIG. 1 are shown as comprising a number of functional blocks. This is schematic only and is not intended to define a strict division between different logic elements of such entities. Each functional block may be provided in any suitable manner. It is to be understood that intermediate values described herein as being formed by a functional block need not be physically generated by the particular functional block at any point and may merely represent logical values which conveniently describe the processing performed by the computer system between its input and output.

The computer system described herein may be embodied in hardware on an integrated circuit. The computer system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a computer system configured to perform any of the methods described herein, or to manufacture a computer system comprising any apparatus described herein. An integrated circuit definition dataset may be, for example, an integrated circuit description.

Therefore, there may be provided a method of manufacturing, at an integrated circuit manufacturing system, a computer system as described herein. Furthermore, there may be provided an integrated circuit definition dataset that, when processed in an integrated circuit manufacturing system, causes the method of manufacturing a computer system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a computer system will now be described with respect to FIG. 9.

Figure 9:
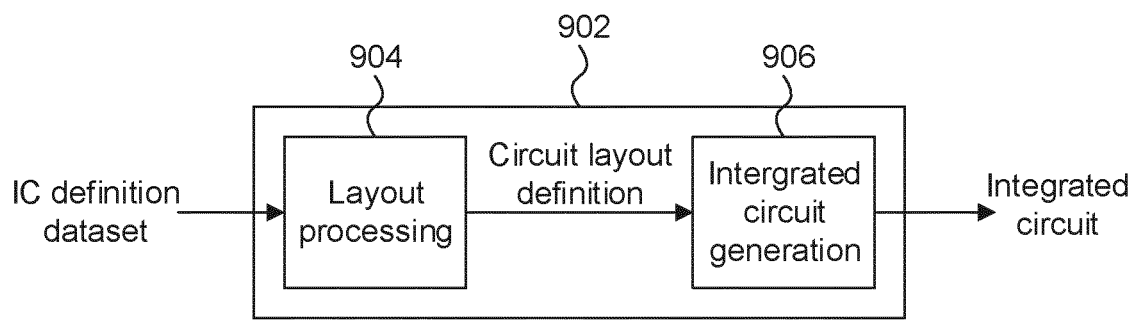
FIG. 9 shows an integrated circuit manufacturing system for generating an integrated circuit embodying a computer system.

FIG. 9 shows an example of an integrated circuit (IC) manufacturing system 902 which is configured to manufacture the computer system described in any of the examples herein. In particular, the IC manufacturing system 902 comprises a layout processing system 904 and an integrated circuit generation system 906. The IC manufacturing system 902 is configured to receive an IC definition dataset (e.g. defining a computer system as described in any of the examples herein), process the IC definition dataset, and generate an IC according to the IC definition dataset (e.g. which embodies a computer system as described in any of the examples herein). The processing of the IC definition dataset configures the IC manufacturing system 902 to manufacture an integrated circuit embodying a computer system as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a computer system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system 906 may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method of moving data from a source memory to a destination memory by a processor comprising a plurality of registers, the destination memory storing a sequence of instructions, wherein the sequence of instructions comprises one or more load instructions and one or more store instructions, the method comprising:
    moving the one or more store instructions from the destination memory to the source memory;
    executing of the one or more load instructions from the destination memory;
    loading the data from the source memory to at least one register in the processor, on executing the one or more load instructions;
    initiating execution of the one or more store instructions stored in the source memory; and
    storing the data from the at least one register to the destination memory on executing the one or more store instructions from the source memory.

2. The method as claimed in claim 1, wherein initiating the execution of the one or more store instructions stored in the source memory is performed on executing a branch instruction subsequent to the one or more load instructions stored in the destination memory.

3. The method as claimed in claim 1, wherein moving the one or more store instructions is performed on executing a set of data transfer instructions in the sequence of instructions.

4. The method as claimed in claim 1, wherein moving the one or more store instructions from the destination memory to the source memory is performed by executing a set of preconfigured instructions before executing the sequence of instructions.

5. The method as claimed in claim 1, wherein the method further comprises performing execution of the load instruction by:
    fetching the load instruction from the destination memory in a first clock cycle, said load instruction identifying a memory address in the source memory of data to be loaded;
    fetching a subsequent load instruction from the destination memory in a second clock cycle; and
    loading the data from the memory address in the source memory to a register in the plurality of registers in the second clock cycle.

6. The method as claimed in claim 1, wherein the method further comprises performing execution of the store instruction by:
    fetching the store instruction from the source memory in a first clock cycle, said store instruction identifying a memory address in the destination memory for storing the data;
    fetching a subsequent store instruction from the source memory in a second clock cycle; and
    storing the data from the register in the plurality of registers to the destination memory in the second cycle.

7. The method as claimed in claim 1, wherein the one or more load instructions and the one or more store instructions are executed in a loop for moving the data from the source memory to the destination memory.

8. The method as claimed in claim 1, wherein the one or more store instructions are stored among the sequence of instructions or as data in the destination memory.

9. The method as claimed in claim 1, wherein the sequence of instructions and the data is stored as machine code.

10. The method as claimed in claim 1, the method further comprises generating the sequence of instructions by converting an assembly code or source code written by a user.

11. A computer system configured for moving data, the system comprising:
    a source memory configured to store data;
    a destination memory configured to store sequence of instructions comprising one or more load instructions and one or more store instructions; and
    a processor, coupled to the source memory and the destination memory, configured to execute the sequence of instructions, wherein the processor is configured to:
        move the one or more store instructions from the destination memory to the source memory;
        executing the one or more load instructions from the destination memory;
        loading the data from the source memory to at least one register in the processor, on executing the one or more load instructions;
        initiating execution of the one or more store instructions stored in the source memory; and
        storing the data from the at least one register to the destination memory on executing the one or more store instructions from the source memory.

12. The system as claimed in claim 11, wherein the processor moves the one or more store instructions to the source memory on executing a set of data transfer instructions among the sequence of instructions.

13. The system as claimed in claim 11, wherein the processor moves the one or more store instructions from the destination memory to the source memory on executing a set of preconfigured instructions before executing the sequence of instructions.

14. The system as claimed in claim 11, wherein the processor executes the one or more store instructions from the source memory on executing a branch instruction among the sequence of instructions.

15. The system as claimed in claim 11, wherein the destination memory is configured to store sequence of instructions in a stack memory.

16. The system as claimed in claim 11, wherein the processor is coupled to the source memory and the destination memory through an instruction path and a data path.

17. The system as claimed in claim 16, wherein the processor fetches the instructions from the source memory and the destination memory through the instruction path.

18. The system as claimed in claim 16, wherein the processor accesses the data from the source memory and move the data to the destination memory through the data path.

19. A non-transitory computer readable storage medium having encoded thereon computer readable code configured to cause the method of claim 1 to be performed when the code is run.

* * * * *